(12) United States Patent
Codilian et al.

(10) Patent No.: US 6,369,972 B1
(45) Date of Patent: Apr. 9, 2002

(54) TEMPERATURE MONITORING METHOD OF A DISK DRIVE VOICE COIL MOTOR FROM A TRAVELED DISTANCE

(75) Inventors: Raffi Codilian, Irvine; George S. Bouchaya, Mission Viejo, both of CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 0 days.

(21) Appl. No.: 09/311,913

(22) Filed: May 14, 1999

(51) Int. Cl.[7] .................................................. G11B 5/55
(52) U.S. Cl. ................. 360/78.04; 360/78.07; 360/78.09
(58) Field of Search ................. 360/78.04, 75, 360/78.06, 78.07, 78.09, 97.02, 97.03; 369/53.12, 53.3; 318/634

(56) References Cited

U.S. PATENT DOCUMENTS

| | | | | |
|---|---|---|---|---|
| 4,149,920 A | * | 4/1979 | Card | 360/77.08 |
| 5,119,250 A | * | 6/1992 | Green et al. | 360/78.06 |
| 5,128,813 A | | 7/1992 | Lee | 360/78.07 |
| 5,268,804 A | * | 12/1993 | Wallis | 360/78.04 |
| 5,557,550 A | * | 9/1996 | Vigil et al. | 702/130 |
| 5,566,077 A | * | 10/1996 | Kulakowski et al. | 360/97.02 X |
| 5,594,603 A | | 1/1997 | Mori et al. | 360/78.04 |
| 5,726,835 A | * | 3/1998 | Scanlon et al. | 360/265 |
| 5,808,438 A | * | 9/1998 | Jeffrey | 318/634 |

FOREIGN PATENT DOCUMENTS

| | | | |
|---|---|---|---|
| JP | 55-70972 | * | 5/1980 |
| JP | 61-280081 | * | 12/1986 |
| JP | 63-32701 | * | 2/1988 |
| JP | 1-32473 | * | 2/1989 |
| JP | 1-46271 | * | 2/1989 |
| JP | 1-303679 | * | 12/1989 |
| JP | 7-211025 | * | 8/1995 |

OTHER PUBLICATIONS

"Direct Access Storage Device Voice Coil Temperature Estimator and Limiter," Sep. 1, 1994, IBM TDB vol. 37, No. 9, pp. 477–478.*

"Disk File Proximate Time," Apr. 1, 1994, IBM TDB vol. 37, No. 4A, pp. 27–30.*

* cited by examiner

Primary Examiner—David Hudspeth
Assistant Examiner—James L Habermehl
(74) Attorney, Agent, or Firm—Milad G Shara (57) ABSTRACT

A method for controlling the current applied to a voice coil motor (VCM) prevents overheating of a coil in the VCM. The method includes the steps of defining an acceleration interval for measuring the distance traveled by a head moved by the VCM. The method also defines a distance traveled during the acceleration interval which can be used as a reference for indicating that the coil is being overheated. The VCM is driven for the acceleration interval and the distance traveled during the interval is measured and compared to the reference distance. If the difference exceeds a threshold, then the current being applied to the coil is controlled to maintain the coil temperature within a limit. If, however, the difference does not exceed the threshold, the current being applied to the coil is controlled to meet a performance requirement.

32 Claims, 4 Drawing Sheets

TEMPERATURE MONITORING METHOD OF A DISK DRIVE VOICE COIL MOTOR FROM A TRAVELED DISTANCE

BACKGROUND OF THE INVENTION

1. Field of the Invention

The present invention relates to methods for enhancing the performance of disk drives through thermal monitoring. More particularly, the present invention relates to improved methods for controlling a voice coil motor (VCM) adapted for moving a head over a disk, to prevent overheating of a coil in the VCM due to excessive application of current to the coil.

2. Description of the Prior Art and Related Information

A typical hard disk drive includes a head disk assembly (HDA) and a printed circuit board assembly (PCBA). The HDA includes at least one magnetic disk (disk), a spindle motor for rotating the disk, and a head stack assembly (HSA) that includes a read/write head with at least one transducer for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly (HGA) that extends from the actuator assembly and biases the head toward the disk; and (3) a flex cable assembly that provides an electrical interconnect with minimal constraint on movement.

A "rotary" or "swing-type" actuator assembly comprises a body portion that rotates on a pivot bearing cartridge between limited positions, a coil portion that extends from one side of the body portion to interact with one or more permanent magnets to form a VCM, and an actuator arm that extends from an opposite side of the body portion to support the HGA.

Within the HDA, the spindle motor rotates the disk or disks, which are the media to and from which the data signals are transmitted via the read write/head(s) on the gimbal attached to the load beam. The performance of the disk is largely dominated by its mechanical latencies. One such mechanical latency is the rotational latency of the drive, which is a function of rotational speed of the disk and hence of the spindle motor. Another such mechanical latency is the seek latency of the drive, which is a function of the speed at which the actuator radially moves across the disk.

Competitive pressures in the disk drive market have compelled disk drive designers and manufacturers to simultaneously boost performance and lower cost. Historically, higher performance has been achieved by, for example, increasing the rotational speed of the spindle motor and/or performing faster seek operations. Faster seek operations, in turn, may be achieved by increasing the control current flowing through the VCM, thereby increasing the actuator's acceleration and deceleration as it moves across the disk. Excessive VCM control currents or control current profiles having a high average value however, may cause the VCM assembly (typically overmolded with a plastic material) to overheat, causing damage to the coil and the drive. For example, when subjected to an instantaneous or average current that is beyond the VCM's design limitations, the coil may generate excessive heat and rupture, or the coil overmold material may delaminate from the actuator assembly, lose its rigidity and/or outgas particulates into the disk drive enclosure, with deleterious results. Such outgassing from the coil overmold, coil insulators and/or from other materials applied to the coil wires (such as wire lubricants, for example) may occur even at relatively low temperatures (85° C., for example). There is a need, therefore, to monitor the temperature of the VCM coil and to prevent damage thereto.

One possible solution that addresses the need to prevent excessive VCM temperatures is to limit the VCM control current so that the heat generated therein remains at all times within conservative limits, independent of present actuator usage patterns. This solution, while effectively preventing the VCM from overheating and obviating the need to monitor the temperature thereof, also results in unacceptably slow drive performance. Another solution is proposed in U.S. Pat. No. 5,594,603 to Mori et al. and assigned to Fujitsu Limited, Japan. In this patent, the current applied to the VCM is used to calculate an approximation of the VCM temperature. This method attempts to mathematically model the thermal behavior of the VCM by devising a number of predetermined coefficients and by quantifying and interrelating the VCM control current, the heat naturally radiated by the VCM, the ambient temperature, the thermal capacity of the VCM and the ambient temperature thereof, among other factors. However, such a mathematical model, although providing an indication of the present VCM temperature, may not accurately provide a calculated temperature value that accords with the present and actual temperature of the VCM. Indeed, a number of factors may skew the results obtained from such mathematical models. For example, the present temperature of the drive or the resistance of the VCM coil may not remain constant and may thus result in changing VCM control current magnitudes. As the VCM control current is used as the basis for the temperature calculations, the VCM may not be driven (i.e., supplied with VCM control current) in an optimal manner and the actuator may not sweep as rapidly across the disk as it might otherwise have, thereby needlessly limiting the overall performance of the drive. Alternatively, should the mathematical model prove to be an inaccurate predictor of actual VCM temperature in certain situations, excessive VCM control currents may be generated, potentially causing damage to the VCM and to the drive. Over many iterations, recursively-applied mathematical models may cause an initial and relatively small error to grow to such a degree that the model no longer accurately reflects present operating conditions. Reliance upon such an inexact mathematical model in modulating the VCM control current may understandably result in less than optimal drive performance characteristics.

Another proposed solution is proposed in U.S. Pat. No. 5,594,603 to Lee (hereafter the '603 patent) and assigned to Quantum Corporation. In this patent, a discrete temperature-sensing element is used to dynamically sense the VCM temperature during the operation of the drive. The output of the temperature-sensing element (e.g., thermistor) is quantized and used to calculate a multiplication factor. The multiplication factor, in turn, is multiplied by a reference velocity command during a seek operation to produce a velocity command that is then compared with a fed back velocity value to generate an error signal that modulates the operation of the actuator (e.g., the VCM control current) during track seek operations. This patent discloses that the thermistor is mounted for thermal conduction directly to the head and disk assembly. While the temperature sensing element may, in fact, provide a direct measurement of the temperature of the VCM (in contrast to the Mori et al. patent above, for example), this method requires mounting a high precision thermistor to the HDA and requires that appropriate signal conditioning means be provided to measure, quantize and interpret the resistance thereof. In many aspects, however, disk drive designers and manufacturers operate in an environment that has acquired many of the characteristics of a commodity market. In such a market, the addition of even a single, inexpensive part can directly and adversely affect competitiveness. In this case, therefore, the addition of the thermistor and associated signal conditioning means discussed in the '603 patent may be of little practical value.

What are needed, therefore, are methods for monitoring the temperature of a disk drive voice coil motor that are accurate, reliable and inexpensive in their implementation. Specifically, what are also needed are temperature monitoring methods, disk drives and computer systems that do not rely upon complex and error prone mathematical modeling schemes or upon costly temperature sensing circuitry. Also needed are methods for monitoring the VCM temperature that allow the VCM control current to be modulated in an optimal manner to achieve fast track seek operations.

SUMMARY OF THE INVENTION

An object of this invention, therefore, is to provide accurate, reliable and inexpensive temperature monitoring methods, as well as disk drives implementing such methods. Another object of this invention is to provide methods for monitoring the VCM temperature that allow the VCM current to be modulated in an optimal manner to prevent overheating of the coil and to achieve fast seek operations.

Accordingly, this invention can be regarded as a method for controlling a VCM adapted for moving a head over a disk, to prevent overheating of a coil in the VCM due to excessive application of current to the coil. According to an embodiment thereof, the method of the present invention includes the steps of defining an acceleration interval (T) and a reference distance (D1). Current is the applied to the coil during a seek operation, thereby causing a rise in coil temperature. Current is then applied to the coil during the acceleration interval and the distance traveled (D2) by the head during the acceleration interval is the measured. The distance traveled during the acceleration interval is compared to the reference distance to obtain a difference (D2−D1). If the difference exceeds a threshold (e.g., D2<D1, for example) the current being applied to the coil is controlled to maintain the coil temperature within a limit. If, however, the difference does not exceed the threshold, the current being applied to the coil is controlled to meet a performance requirement.

According to further embodiments, the acceleration interval may be defined as a function of a number of servo wedges traversed by the head as the disk rotates at constant angular velocity. The reference distance defining step and the distance traveled measuring step may be determined as a function of a number of tracks of the disk swept by the head during the acceleration interval. The steps of applying current during the acceleration interval, measuring and comparing may be carried out independently of the seek operation and/or at a predetermined interval. The predetermined interval may be adaptive, the interval being shorter during periods of high disk accesses and lower during periods of lower disk accesses. Alternatively, the steps of applying current during the acceleration interval, measuring and comparing may be carried out incident to the seek operation. The step of controlling the current being applied to the coil to maintain the coil temperature within a limit may include a step of reducing the current being applied to the coil. The limit may be selected as the highest temperature at which the coil does not overheat. For example, the limit may be selected to be about 85° C. The distance traveled and/or the difference may be adjusted to compensate for changes in a coil resistance and/or voltage. The distance traveled and/or the difference may be discounted to compensate for an increased coil resistance and/or voltage. The reference distance may be defined at a known temperature, such as test chamber temperature, for example.

The present invention may also be viewed as a disk drive which, according to one embodiment, includes a disk having a recording surface for recording data thereon; a microprocessor for controlling an operation of the disk drive; a servo controller controlled by the microprocessor and an actuator including a head to read and write data on the disk; a VCM controlled by the servo controller, the VCM causing the head to sweep radially across the disk in response to a VCM control current and a VCM driver, controlled by the servo driver, for applying the VCM control current to the VCM. A plurality of processes are spawned by the microprocessor, the processes including processing logic for controlling the VCM to prevent overheating of a coil in the VCM due to excessive application of VCM control current to the coil. The processing logic includes or causes the following steps to be carried out: defining an acceleration interval (T); defining a reference distance (D1); applying VCM control current to the coil during a seek operation to cause a rise in coil temperature; applying VCM control current to the coil during the acceleration interval; measuring a distance traveled (D2) by the head during the acceleration interval; comparing the distance traveled during the acceleration interval to the reference distance to obtain a difference (D2−D1); and if the difference exceeds a threshold (D2<D1): controlling the VCM control current being applied to the coil to maintain the coil temperature within a limit; else if the difference does not exceed the threshold: controlling the VCM control current being applied to the coil to meet a performance requirement.

According to further embodiments, the acceleration interval may be defined as a function of a number of servo wedges traversed by the head as the disk rotates at constant angular velocity. The reference distance defining step and the distance traveled measuring step may be determined as a function of a number of tracks of the disk traversed by the head during the acceleration interval. The steps of applying current during the acceleration interval, measuring and comparing may be carried out independently of the seek operation and/or at a predetermined interval. The predetermined interval may be adaptive, the interval being shorter during periods of high disk accesses and lower during periods of lower disk accesses. Alternatively, the steps of applying current during the acceleration interval, measuring and comparing may be carried out incident to the seek operation. The step of controlling the current being applied to the coil to maintain the coil temperature within a limit may include a step of reducing the current being applied to the coil. The limit may be selected as the highest temperature at which the coil does not overheat. For example, the limit may be selected to be about 85° C. The distance traveled and/or the difference may be adjusted to compensate for changes in a supply voltage or a fixed voltage may be provided. The reference distance may be defined at a known temperature, such as test chamber temperature, for example.

The foregoing and other features of the invention are described in detail below and set forth in the appended claims.

DETAILED DESCRIPTION

Figure 1:
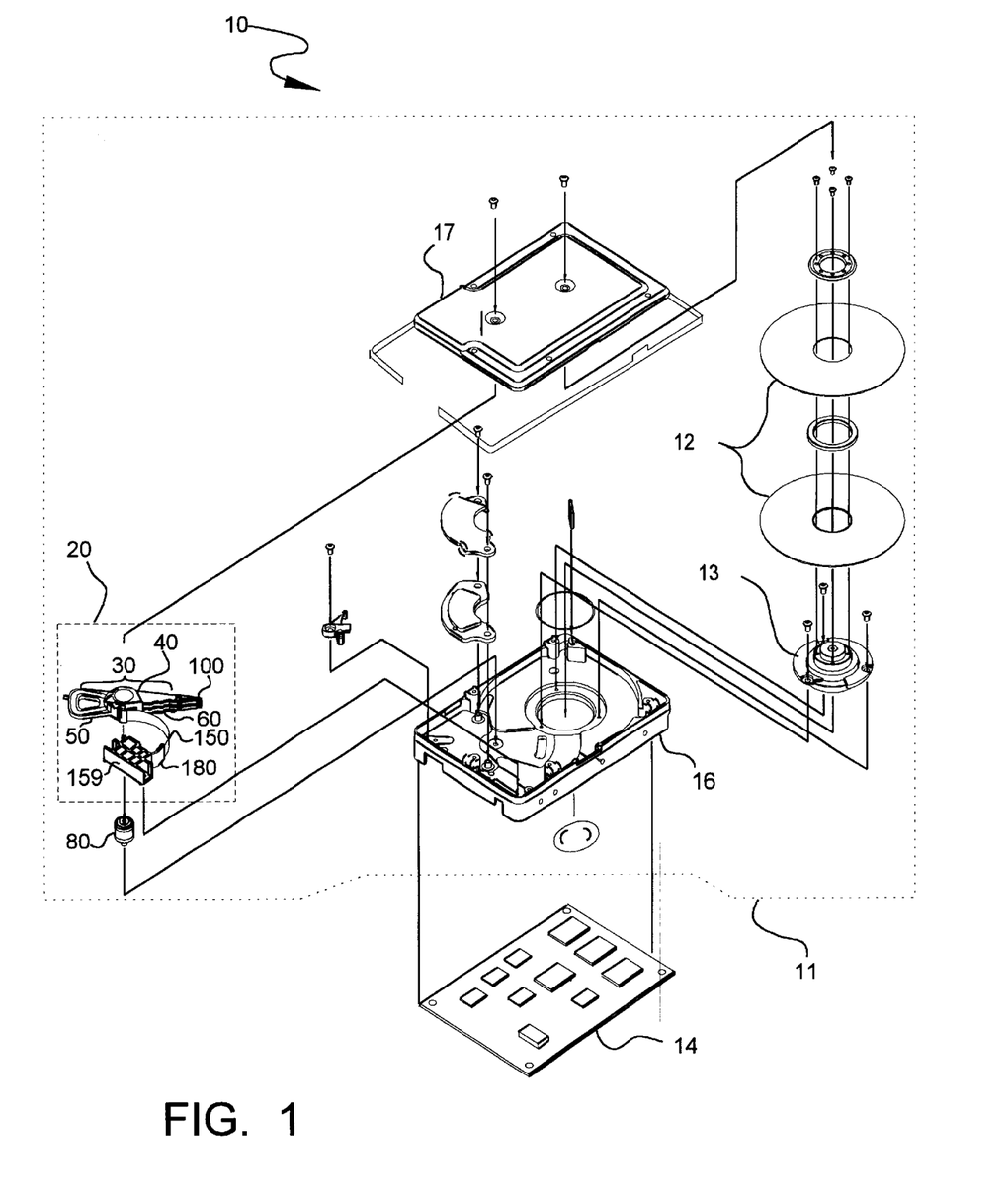
FIG. 1 shows an exploded view of the major mechanical components of a magnetic disk drive with which the methods according to the present invention may be practiced.

FIG. 1 shows the principal mechanical components of a disk drive such as a magnetic hard disk drive 10 upon which the methods according to the present invention may be practiced. With reference to FIG. 1, the preferred disk drive 10 is an integrated drive electronics (IDE) drive comprising an HDA 1 and a PCBA 14.

The HDA 11 includes a base 16 and a cover 17 attached to the base 16 that collectively house a magnetic disk 12 (two shown in FIG. 1, four shown in FIG. 2), a spindle motor 13 attached to the HDA base 16 for rotating the mounted disk 12, a head stack assembly 20, and a pivot bearing cartridge 80, such as a stainless steel pivot bearing cartridge, that rotatably supports the HSA 20 on the HDA base 16. The spindle motor 13 may rotate the disk 12 at a constant angular or constant linear velocity. The preferred head stack assembly 20 comprises a swing-type or rotary actuator assembly 30, at least one head gimbal assembly 100, and a flex circuit cable assembly 180. The rotary actuator assembly 30 includes a body portion 40, at least one actuator arm 60 cantilevered from the body portion 40, and a coil portion 50 cantilevered from the body portion 40 in an opposite direction from the actuator arm 60. The coil portion 50 extends from the body portion 40 to interact with one or more permanent magnets to form the VCM. The actuator arm 60 supports the head gimbal assembly 100 with a head located at its far end that is biased toward and moveable over the disk 12. The flex cable assembly 180 includes a flex circuit cable 150 and a flex clamp 159. The head stack assembly 20 is pivotally secured to the HDA base 16 via the pivot bearing cartridge 80 so that the head at the distal end of the head gimbal assembly 100 may be moved over a recording surface of the disk 12. The storage capacity of the HDA 11 may be increased, as shown in FIG. 1, by including several disks 12 and a head stack assembly 20 having a vertical "stack" of head gimbal assemblies 100 supported by multiple actuator arms 60.

Figure 2:
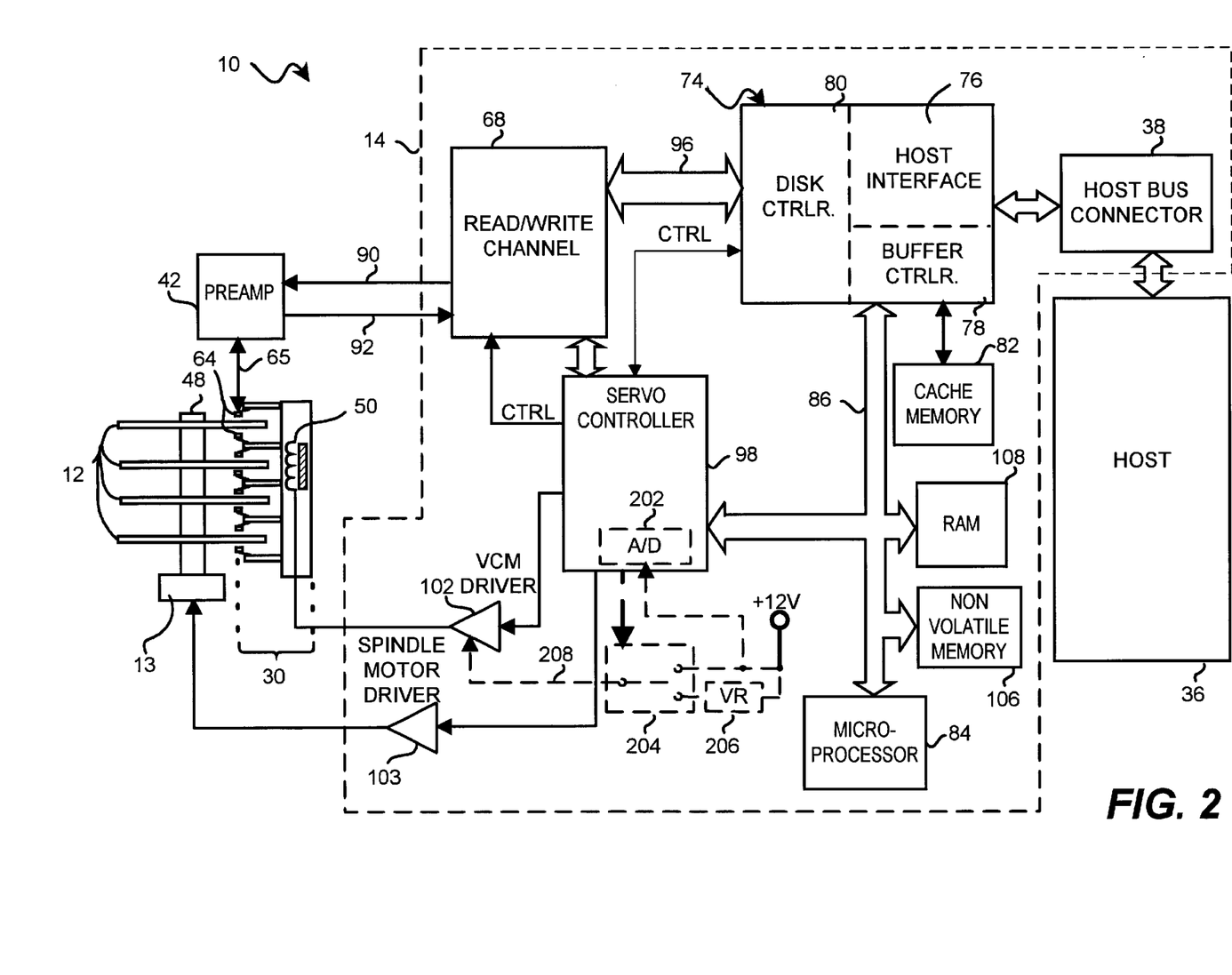
FIG. 2 is a functional block diagram of a computer system with which the methods according to the present invention may be practiced.

FIG. 2 is a functional block diagram of the major electrical components of the disk drive 10 upon which the present invention may be practiced. As shown in FIG. 2, disk drive 10 is connected to a host computer 36 via host bus connector 38 for the transfer of commands, status and data. One suitable standard for such connection is the EIDE standard presently favored for desktop personal computers.

The disk drive 10 comprises one or more disks 12 for data storage, a spindle motor 13 for rapidly spinning each disk 12 (four shown in FIG. 2) on a spindle 48 and an actuator assembly 30 for swinging a plurality of heads 64 in unison over each disk 12. The heads 64 are connected to a preamplifier 42 via a cable assembly 65 (such as the flex cable assembly 180 of FIG. 1, for example) for reading and writing data on disks 12. Preamplifier 42 is connected to channel circuitry in controller PCBA 32 via read data line 92 and write data line 90.

The controller PCBA 14 of the disk drive 10 comprises a read/write channel 68, servo controller 98, host interface and disk controller (HIDC) 74, VCM driver 102, spindle motor driver (SMD) 103, interface processor 84, and several memory arrays, including cache memory buffer 82, random access memory (RAM) 108, and non-volatile memory 106.

Host-initiated operations for reading and writing data in disk drive 10 are executed under the control of a microprocessor 84 connected to the controllers and memory arrays via a bus 86. Program code executed by microprocessor 84 is stored in non-volatile memory 106 and RAM 108. Program overlay code stored on reserved tracks of disks 46 may also be loaded into RAM 108 as required for execution. As described in detail below, the microprocessor 84 executes the method of the invention, in combination with the HIDC 74 and the servo controller 98. Alternatively, the functionality of the microprocessor 84, the HDIC 74, the servo controller 98 and/or the host bus connector 38 may be integrated into a single disk processor unit. In this case, the present invention is carried out by this single disk processor unit.

During disk read and write operations, data transferred by preamplifier 42 is encoded and decoded by read/write channel 68. During read operations, channel 68 decodes data into digital bits transferred on an NRZ bus 96 to HIDC 74. During write operations, the HIDC 74 provides digital data over the NRZ bus 96 to channel 68 that encodes the data prior to its transmittal to preamplifier 42. Preferably, channel 68 employs partial response maximum likelihood (PRML) coding techniques, although the invention may be practiced with equal advantage using other coding processes.

The HIDC 74 comprises a disk controller 80 for formatting and providing error detection and correction of disk data, a host interface controller 76 for responding to commands from host 36, and a buffer controller 78 for storing data which is transferred between disks 46 and host 36. Collectively, the controllers in the HIDC 74 provide automated functions that assist the microprocessor 84 in controlling disk operations. A servo controller 98 provides an interface between the microprocessor 84, the actuator assembly 30 and the spindle motor 13. Microprocessor 84 commands logic in servo controller 98 to position actuator 40 using a VCM driver 102 and to precisely control the rotation of spindle motor 13 with a spindle motor driver 103.

The present invention exploits observed changes in the motion of the actuator assembly 30 over temperature to gain information relative to the present VCM temperature. These changes are caused at least in part by changes in the electrical characteristics of the VCM driving the motion of the actuator assembly 30. Indeed, rather than resorting to direct measurement of the temperature of the VCM by placing a thermistor or other temperature sensing apparatus in proximity to the VCM or resorting to complex mathematical modeling of the voice coil motor temperature based upon the VCM control current, the present invention utilizes the fact that, for a given voltage, the VCM control current changes over temperature. Within the design limits of the VCM, the VCM will cause the actuator assembly 30 to sweep over the disk 12 at an angular acceleration that increases with increasing VCM control current. As the resistance of the coil winding portion 50 (hereafter $R_w$) increases with increasing temperature (dissipating more of the applied energy as heat in the process), the VCM control current decreases with increasing temperature (for a given voltage), according to Ohm's law. Therefore, the angular acceleration of the actuator assembly 30 decreases with increasing temperature. Moreover, as the torque developed by the VCM is proportional to acceleration and to the mass thereof, decreasing the acceleration of the VCM correspondingly decreases its torque. Thus, both the winding resistance $R_w$ and the VCM motor torque constant $K_T$ adversely affect the acceleration (and therefore the velocity) of the VCM with increasing temperature.

The present invention derives information relative to the present temperature of the VCM, not by direct measurement or by VCM control current-based calculations, but by monitoring the radial distance traveled by the actuator assembly 30 over the disk 12 during a fixed period of time in response to the application of VCM control current to the VCM. In turn, this radial distance may be compared with the radial distance traveled by the actuator assembly 30 over the disk 12 during the same fixed period of time at a known temperature such as, for example, room temperature. Any reduction in the radial distance traveled by the actuator assembly 30 (caused by an increased $R_w$ and a decreased $K_T$), therefore, is indicative of increased temperature.

The foregoing assumes that the voltage applied to VCM driver 102 for providing current to the VCM coil portion 50 is removed as a variable. Referring to FIG. 2, two optional embodiments are shown for neutralizing voltage variations in deploying the invention. In one embodiment, a switch 204 is connected to the voltage terminal of VCM driver 102. Switch 204 selects between a supply voltage such as 12 vdc and a regulated voltage from a voltage regulator (VR) 206. During normal seek events, VCM driver 102 is provided with 12 vdc via one position of switch 204. In the alternate position, during an acceleration interval to define the reference traveled distance or to subsequently measure a traveled distance for comparison to the reference distance, the regulated voltage from VR 206 is provided to VCM driver 102. In this manner, the voltage is the same value for both the reference definition and the subsequent measurement so that voltage is removed as a variable for determining the change in current in VCM coil 50 owing to temperature. In an alternate embodiment, supply voltage 12 vdc is provided to an analog-to-digital converter 202 in servo controller 98, thereby enabling microprocessor 84 to read the value of the supply voltage in each case and thereby apply an adjustment to the distance measurement which accounts for voltage variation between the voltage applied during reference distance definition and the voltage applied during any later measurements.

Data on a magnetic disk may be stored, for example, along a plurality of concentric and equidistant tracks, each uniquely identified by a track ID field. The number of tracks over which the actuator assembly 30 travels, therefore, constitutes a convenient measure of the distance traveled. The present invention, however, is not to be limited to seek tracks as the unit of measurement of the distance traveled, as other units of measurement may be employed. Monitoring the number of tracks over which the actuator assembly 30 travels over a fixed period of time, according to an embodiment of the present invention, provides an indication of the temperature of the VCM.

Figure 3:
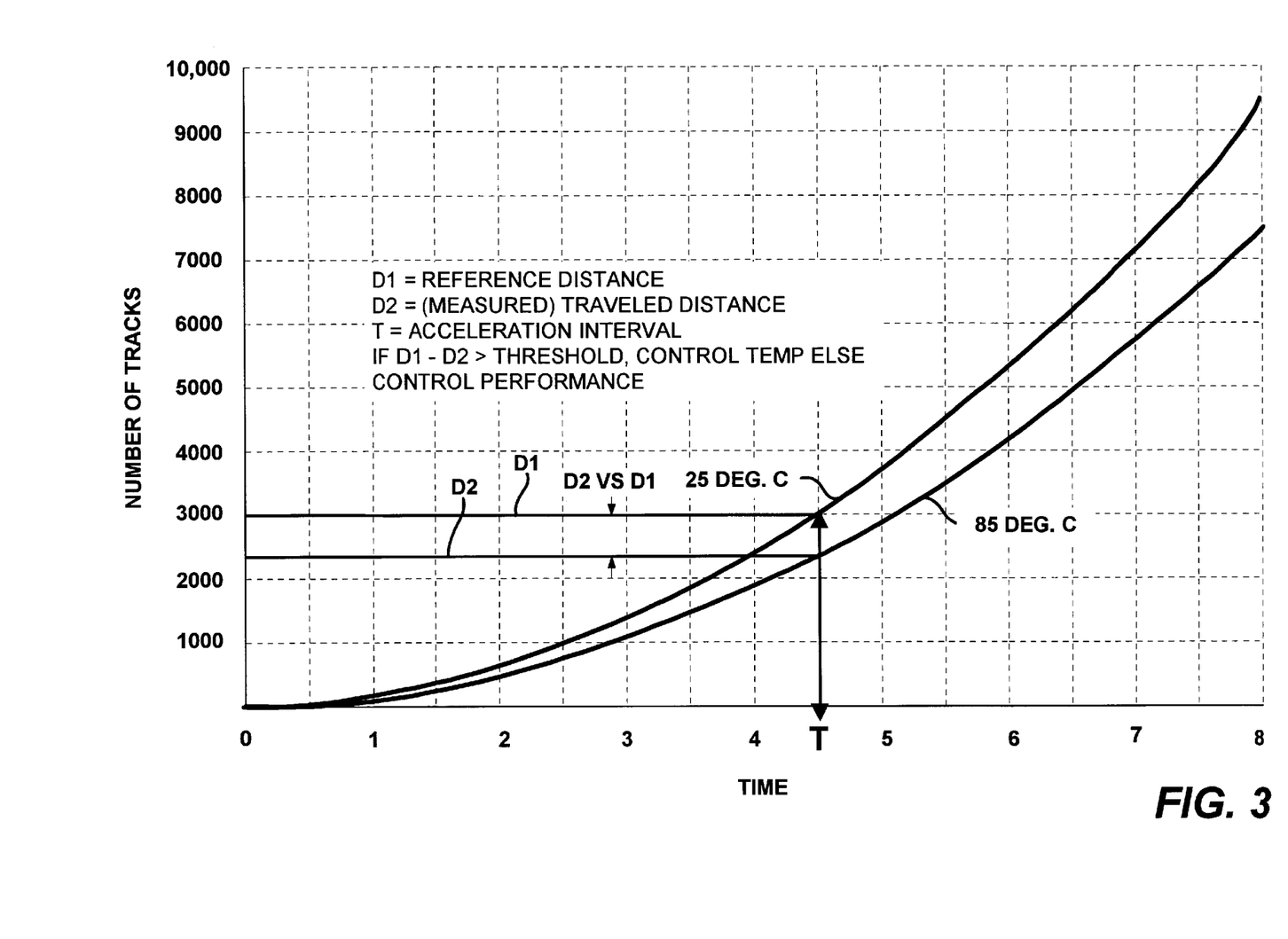
FIG. 3 is a graph interrelating the distance traveled by the actuator assembly read-write head(s) and time, to illustrate an embodiment of the present invention.

FIG. 3 shows an example of such a relationship between the number of tracks traveled per unit time and the temperature of the VCM, as determined experimentally. In this example, the ordinate of the graph is graduated in terms of the number of tracks, from 0 at the origin to 10,000, to choose an arbitrary finite and non-limiting range. The abscissa of the graph represents time (in milliseconds in the embodiment illustrated in FIG. 3). The abscissa may also be conveniently labeled according to the number of so-called servo wedges traversed by the head as the actuator sweeps from one radial point to another radial point as the disk rotates at a precise and constant rotational speed. Two curves are shown in FIG. 3, one curve representing sampled numbers of tracks traveled by the actuator assembly 30 over a period of time at 25° C. ($R_w$ equal to about 14.2 Ω and $K_T$ equal to about 13.6) and another curve representing sampled numbers of tracks traveled by the actuator assembly 30 at 85° C. over the same period of time. At 85° C., $R_w$ is equal to about 17.52 Ω (a 24 percent change from the $R_w$ at 25° C.) and $K_T$ is equal to about 12.51 (an 8 percent change over the $K_T$ at 25° C.). The period of time is chosen to insure that the actuator does not engage a crash stop during the acceleration interval and a subsequent de-acceleration interval. An 8-millisecond period of time has been chosen in FIG. 3. As can be seen from inspection of FIG. 3, the actuator assembly 30 travels over a greater number of tracks at 25° C. than it does during the same period of time at 85° C. For example, at 25° C., the actuator assembly 30 may sweep over about 2500 tracks in 4 milliseconds (or an equivalent number of tracks or servo wedges), whereas the same actuator assembly 30 may only travel about 1900 tracks during the same time period at 85° C. This thermally based behavior, it has been found, is sufficiently consistent over the operating temperature range of a disk drive to derive information relative to the present temperature of the VCM therefrom in a reliable manner by monitoring the number of tracks over which the actuator assembly 30 travels over a given period of time. The present invention, therefore, includes a method for controlling a VCM adapted for moving a head over a disk, to prevent overheating of the coil in the VCM due to excessive application of current to the coil. Considering now FIGS. 3 and 4 collectively, the method of the present invention includes a step S1 of defining an acceleration interval, such as shown at reference T in FIG. 3. The acceleration interval T is shown in FIG. 3 at about 4.5 milliseconds for exemplary and illustrative purposes only. However, the present invention is not to be limited thereto, as another acceleration interval or intervals may be freely chosen. From FIG. 3, it can be seen that the head sweeps over a distance D1 during the acceleration interval T, when the temperature of the VCM is at 25° C. The distance D1 swept by the head during the acceleration interval T may be called the reference distance, as shown in step S2. The reference distance D1 establishes a target distance against which the thermal performance of the drive may be subsequently measured. The reference distance D1 may be defined during the initial burn-in and testing phase of the manufacture of the drive and may be stored in a memory, such as the non-volatile memory shown at reference numeral 106 in FIG. 2, for example. The present invention is at least partly predicated upon the realization that the performance of the drive exhibits measurable, consistent and hence predictable degradation, in terms of distance traveled by the head over the tracks of the disk relative to the reference distance D1 as the temperature of the VCM increases.

As the reference distance D1 has now been now established in terms of tracks crossed during the acceleration interval T, current may be applied to the coil during a seek operation or seek operations as shown in step S3, thereby causing the coil temperature to rise. Such seek operation or operations may be incident to the normal operation of the drive and may cause data to be read from or written to the disk or disks. After such seek operation or operations, the drive may be periodically tested to ascertain the magnitude of any deviation from the established reference distance D1. To do so, current may be applied to the coil during a period of time equal to the previously defined acceleration interval T, as noted in step S4. Then, the distance traveled by the head during the acceleration T interval may be measured according to step S5. This distance traveled is shown in FIG. 3 at reference D2, and is about 2400 tracks when the coil temperature is at 85° C. during the acceleration interval T in the example of FIG. 3. The distance traveled D2 may be temporarily stored in, for example, the RAM 108 or within storage internal to the microprocessor 84 itself. Although not shown as a specific step, it should be noted that the aforementioned structure to neutralize the effects of voltage variation should be taken into account at this point. That is, either a regulated known voltage is applied as during the definition of the reference distance or the actual voltage is read as from A/D 202 and used to adjust the distance traveled or the difference from the reference distance to eliminate voltage as a variable. It should be noted that the curves shown in FIG. 3 are not intended to represent any broad class of disk drives. Indeed, FIG. 3 is provided as an illustrative example only, it being understood that different combinations of disk drive architectures, VCM current profiles, VCM temperatures, other drive characteristics and/or ambient conditions may produce curves that are different from those shown in FIG. 3.

According to a preferred embodiment of the present invention, the measuring step is carried out by duplicating (inasmuch possible) the prevailing conditions at the time when the reference distance D1 was defined. Therefore, according to a preferred embodiment, the head may be caused to return to the same starting point (e.g., the same track number, for example) as it was at the beginning of the acceleration interval T when the reference distance D1 was defined. For example, if the head was initially positioned at track 5000 at the beginning of the acceleration interval T and thereafter traveled an additional 3000 tracks during the acceleration interval T (equal to about 4.5 milliseconds or an equivalent number of servo wedges, in the example shown in FIG. 3), to end up at track 8,000 at the end of the acceleration interval T, then the head is preferably repositioned at track 5000 when the distance traveled D2 is to be measured. Among other considerations, any force exerted on the actuator by the flex cable at a given radial position will be reproduced. In this manner, any difference in the number of tracks traveled may be primarily due to a difference in temperature of the VCM coil.

The measured distance traveled D2 may now be compared, as shown at step S6, to the reference distance D1 to obtain a difference D2−D1. The difference between D2 and D1, in the example shown in FIG. 3 is about 600 tracks, if D1 is defined to be about 3000 tracks and D2 is measured to be about 2400 tracks. Therefore, at 85° C., the head travels over 600 fewer tracks during the acceleration interval T than it does at 25° C. in the illustrative example of FIG. 3.

Figure 4:
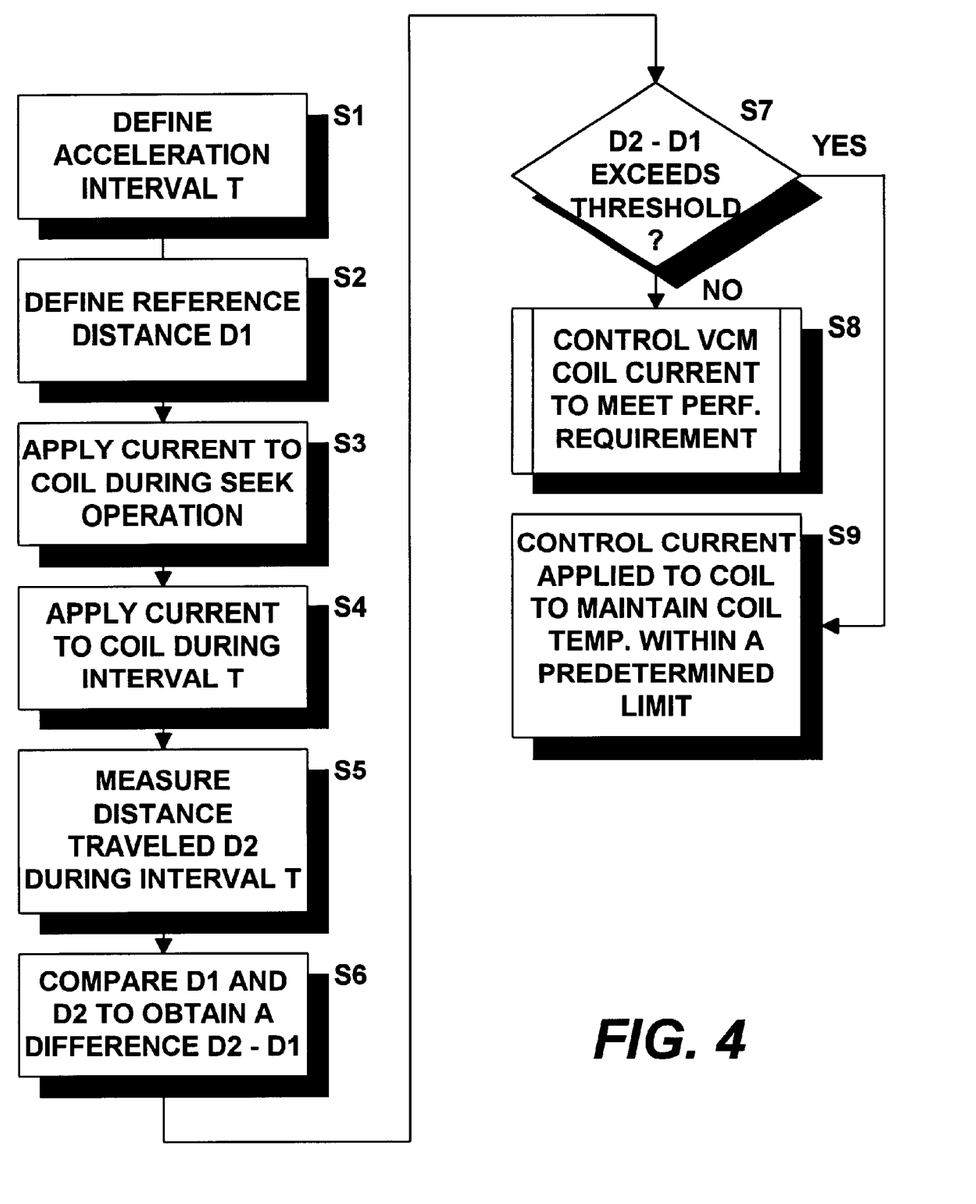
FIG. 4 is a flowchart of a method for controlling a VCM adapted for moving a head over a disk, to prevent overheating of a coil in the VCM due to excessive application of current to the coil.

Having now established the distance traveled D2, the reference distance D1 and having compared the two quantities, some action may be taken based upon the result of the comparison. At step S7, it is determined whether the difference D2−D1 exceeds a predetermined threshold. According to an embodiment of the present invention, if the difference between D1 and D2 does not exceed the predetermined threshold, then the current being applied to the VCM coil is controlled to meet a performance requirement, as shown in step S8. That is, the current applied to the VCM coil is controlled, in the normal course of operation, to cause the actuator to sweep across the disk as quickly as necessary to meet the designed performance specification of the drive. However, if the difference between D1 and D2 does exceed (or equal) the predetermined threshold, the current applied to the VCM coil is controlled to maintain the coil temperature within a predetermined limit, as shown in step S9. In this case, it is determined that the performance of the drive, as inferred from the measured degradation in the number of tracks swept during the acceleration interval T, merits controlling the current applied to the coil in a manner that is different than the control thereof during normal operation of the drive. Indeed, if the difference D2−D1 exceeds the predetermined threshold, then the current applied to the coil is preferably controlled to bring the temperature thereof within a predetermined limit. The predetermined limit, preferably, may be below that temperature that may otherwise cause damage and/or outgassing from the VCM assembly and/or the VCM coil and its structural content such as adhesives etc. For example, when the difference D2−D1 exceeds the predetermined threshold, the current applied to the coil may be decreased so as to maintain the coil temperature below the predetermined limit, such as 85° C. Other limits may be determined based upon the materials used in the VCM coil or in the VCM assembly in its entirety. For example, this limit may be determined based upon the characteristics of the materials utilized in the coil and/or VCM assembly. For example, the limit may be set as high as the highest temperature at which the coil or VCM assembly does not exhibit appreciable outgassing, warpage or other undesired phenomena.

The threshold at which the decision is made to control the current applied to the coil to maintain the coil temperature within the predetermined limit or to control the current to meet the performance requirement may itself be chosen according to the physical characteristics of the coil, VCM and/or drive. For example, the threshold may be set as low as the reference distance D1. That is, whenever the actuator sweeps across fewer tracks during the acceleration interval T than D1, the current applied to the coil may be controlled to maintain the coil within the predetermined limit. Generally, this will entail a reduction in the magnitude of the current applied to the coil. Alternatively, the predetermined threshold may be set at to a selected distance away from the distance D1. When the number of tracks swept by the actuator is used as the measure of distance over the disk, the selected distance may be set, for example, at 200 tracks away from the track number corresponding to the reference distance D1. In that case, whenever the coil temperature rises sufficiently to cause the actuator to sweep over 200 fewer tracks during the acceleration interval T than it did when the reference distance D1 was defined, then the current applied to the coil may be controlled to maintain the coil temperature within the predetermined limit. The predetermined threshold, generally, may be set to that number of tracks that constitutes the maximum desired or allowable degradation relative to the reference distance D1. In this example, whenever the thermally induced performance degradation exceeds 200 tracks (the maximum desired degradation from the reference distance D1), the current may be decreased to reduce the coil temperature sufficiently to maintain it within the predetermined limit (again as determined by the distance traveled by the actuator during the acceleration interval T). Alternatively, a delay may be imposed between successive seek operations, to allow the coil temperature to decrease sufficiently to maintain it within the predetermined limit by reducing the average current applied to the coil.

The steps of measuring D2 and comparing the distances D1 and D2 may be carried out, for example, at an adaptive interval based upon prevailing disk usage patterns or may be carried out as an operation that is distinct and independent of the actuator's normal seek operations. The measuring and comparing steps, according to further embodiments of the present invention, may be carried out at a fixed interval or at an adaptive interval based upon the measurement process detecting an approaching threshold. For example if successive regularly timed measurements indicate a trend of sharply increasing temperature, the time between measurements may be significantly reduced to allow for control measures to be applied preventively. In that case, each measurement may dictate a varying degree of control to be applied for reducing the current to and the temperature of the coil. Accordingly, a series of varying difference thresholds may be in effect to enable adaptive measurement and control actions. Indeed, during periods of frequent disk accesses, it may be more important to monitor the temperature of the VCM in the manner disclosed herein more frequently than during periods of lighter disk usage. According to a preferred embodiment of the present invention, the distance traveled (D2) measuring step, the comparing step and subsequent current control measures are carried out as an operation that is distinct and separate of the actuator's normal seek operations. In another embodiment, the measurement may be embedded within a host initiated seek operation. The aforementioned measuring, comparing and control steps may be carried out at the request of the host, or may be carried out by the drive itself, independently of the host computer. According to a preferred embodiment of the present invention, the aforementioned steps are carried out by the drive itself, independently of the host. For example, the instructions for carrying out the measuring, comparing and controlling steps may be coded in the drive's firmware.

Preferably, the reference distance is measured and defined during the disk drive manufacturing process. During this process, the disk drive is placed in a controlled environment test chamber where the ambient temperature and supply voltage are known and constant, at least during the time the disk drive is self-calibrating. Therefore the temperature at which the reference distance is defined is that of the test chamber. In another embodiment, the reference distance may be defined at room temperature.

The present invention allows the microprocessor 84 to cause the servo controller 98 to direct the VCM driver 102 to supply the VCM with a control current that will result in the fastest possible track seek operations, while maintaining the VCM within a target safe and sustainable temperature or temperature range. As the VCM temperature is maintained within a predefined safe and sustainable temperature limit by inference from the observed physical behavior of the actuator assembly 30 itself, the methods according to the present invention inherently take into account substantially all of the factors that may skew other models of VCM temperature that are based upon such variables as VCM control current magnitudes and the like. For example, the heat radiated by the VCM, the overall temperature of the drive, the usage patterns of the drive, for example, are all factors that affect the acceleration of the actuator assembly 30 over the disk 12 (and thus the distance traveled D2 during the acceleration interval T) and as such, are all accounted for by the method according to the present invention.

While the foregoing detailed description has described preferred embodiments of the present invention, it is to be understood that the above description is illustrative only and not limiting of the disclosed invention. Modifications may occur to those of skill in this art. The present invention, therefore, is to be limited only by the claims as set forth below.

We claim:

1. A method for controlling a voice coil motor (VCM) adapted for moving a head over disk, to prevent overheating of a coil in the VCM due to excessive application of current to the coil, the method comprising the steps of:

defining an acceleration interval (T);

defining a reference distance (D1);

applying current to the coil during a seek operation to cause a rise in coil temperature;

applying current to the coil during the acceleration interval;

measuring a distance traveled (D2) by the head during the acceleration interval;

comparing the distance traveled during the acceleration interval to the reference distance to obtain a difference (D2−D1); and if the difference exceeds a threshold:

controlling the current being applied to the coil to maintain the coil temperature within a limit; else if the difference does not exceed the threshold:

controlling the current being applied to the coil to meet a performance requirement.

2. The method of claim 1, wherein the acceleration interval is defined as a function of a number of servo wedges traversed by the head as the disk rotates at constant angular velocity.

3. The method of claim 1, wherein the reference distance defining step and the distance traveled measuring step are determined as a function of a number of tracks of the disk traversed by the head during the acceleration interval.

4. The method of claim 1, wherein the steps of applying current during the acceleration interval, measuring and comparing are carried out independently of the seek operation.

5. The method of claim 1, wherein the steps of applying current during the acceleration interval, measuring and comparing are carried out at a predetermined interval.

6. The method of claim 5, wherein the predetermined interval is adaptive, the interval being shorter as the difference approaches the threshold.

7. The method of claim 1, wherein the steps of applying current during the acceleration interval, measuring and comparing are carried out incident to the seek operation.

8. The method of claim 1, wherein the step of controlling the current being applied to the coil to maintain the coil temperature within a limit includes a step of reducing the current being applied to the coil.

9. The method of claim 1, wherein the step of controlling the current being applied to the coil to maintain the coil temperature within a limit includes a step of delaying applying current to the coil to provide a lower average current.

10. The method of claim 1, wherein the limit is equal to or less than about 85° C.

11. The method of claim 1, further comprising the step of reading a register to determine the value of a supply voltage being applied to provide current to the coil.

12. The method of claim 1, wherein one of the distance traveled and the difference is adjusted to compensate for a variation of the supply voltage value.

13. The method of claim 1, wherein the reference distance is defined at a known temperature.

14. The method of claim 13, wherein the known temperature is a test chamber temperature.

15. The method of claim 1 further comprising the step of applying a regulated voltage whose value is known to the disk drive to provide current to the coil.

16. The method of claim 1 wherein the measured distance traveled during the acceleration interval starts at the same radial position as a starting radial position for defining the reference distance.

17. A disk drive comprising:
   a disk having a recording surface for recording data thereon;
   a microprocessor for controlling an operation of the disk drive;
   a servo controller controlled by the microprocessor;
   an actuator including:
      a head to read and write data on the disk;
      a voice coil motor (VCM) controlled by the servo controller, the VCM causing the head to sweep radially across the disk in response to a VCM control current;
      a VCM driver, controlled by the servo driver, for applying the VCM control current to the VCM;
   a plurality of processes spawned by the microprocessor, the processes including processing logic for controlling the VCM to prevent overheating of a coil in the VCM due to excessive application of VCM control current to the coil, the processing logic including the steps of:
      defining an acceleration interval (T);
      defining a reference distance (D1);
      applying VCM control current to the coil during a seek operation to cause a rise in coil temperature;
      applying VCM control current to the coil during the acceleration interval;
      measuring a distance traveled (D2) by the head during the acceleration interval;
      comparing the measured distance traveled during the acceleration interval to the reference distance to obtain a difference (D2−D1); and
      if the difference exceeds a threshold:
         controlling the VCM control current being applied to the coil to maintain the coil temperature within a limit; else if the difference does not exceed the threshold:
         controlling the VCM control current being applied to the coil to meet a performance requirement.

18. The disk drive of claim 17 wherein the acceleration interval is defined as a function of a number of servo wedges traversed by the head as the disk rotates at constant angular velocity.

19. The disk drive of claim 17, wherein the reference distance defining step and the distance traveled measuring step are determined as a function of a number of tracks of the disk swept by the head during the acceleration interval.

20. The disk drive of claim 17, wherein the steps of applying VCM control current during the acceleration interval, measuring and comparing are carried out independently of the seek operation.

21. The disk drive of claim 17 wherein the steps of applying VCM control current during the acceleration interval, measuring and comparing are carried out at a predetermined interval.

22. The disk drive of claim 21, wherein the predetermined interval is adaptive, the interval being shorter as the difference approaches the threshold.

23. The disk drive of claim 17 wherein the steps of applying VCM control current during the acceleration interval, measuring and comparing are carried out incident to the seek operation.

24. The disk drive of claim 17, wherein the step of controlling the VCM control current being applied to the coil to maintain the coil temperature within a limit includes a step of reducing the VCM control current being applied to the coil.

25. The disk drive of claim 17, wherein the limit is a highest temperature at which the coil does not overheat.

26. The disk drive of claim 17, wherein the limit is equal to or less than about 85° C.

27. The disk drive of claim 17, wherein the processing logic includes a means for measuring a supply voltage being applied to provide current to the coil.

28. The disk drive of claim 27, wherein one of the distance traveled and the difference is adjusted to compensate for a variation of the supply voltage value.

29. The disk drive of claim 17 wherein the reference distance is defined at a known temperature.

30. The disk drive of claim 17, wherein the known temperature is a test chamber temperature.

31. The disk drive of claim 17 wherein a voltage applied to the coil during the acceleration interval is regulated on the disk drive.

32. The disk drive of claim 17 wherein the measured distance traveled during the acceleration interval starts at the same radial position as a starting radial position for defining the reference distance.

* * * * *